US009457758B2

(12) United States Patent
Kansteiner

(10) Patent No.: US 9,457,758 B2
(45) Date of Patent: *Oct. 4, 2016

(54) PRE-WEAKENED COVER FOR AN AIRBAG AND METHOD OF MAKING

(71) Applicant: INTEVA PRODUCTS, LLC, Troy, MI (US)

(72) Inventor: Udo Kansteiner, Witten (DE)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/670,760

(22) Filed: Mar. 27, 2015

(65) Prior Publication Data

US 2015/0266444 A1 Sep. 24, 2015

Related U.S. Application Data

(63) Continuation of application No. 14/053,092, filed on Oct. 14, 2013, now Pat. No. 9,296,355.

(60) Provisional application No. 61/713,667, filed on Oct. 15, 2012.

(51) Int. Cl.
*B60R 21/205* (2011.01)
*B60R 21/2165* (2011.01)
*B26D 3/00* (2006.01)

(52) U.S. Cl.
CPC ............ *B60R 21/2165* (2013.01); *B26D 3/00* (2013.01); *B60R 21/205* (2013.01); *B60R 2021/21652* (2013.01); *Y10T 83/02* (2015.04); *Y10T 83/0341* (2015.04)

(58) Field of Classification Search
CPC .................. B60R 21/205; B60R 21/2165
See application file for complete search history.

(56) References Cited

U.S. PATENT DOCUMENTS

| 5,685,560 A | 11/1997 | Sugiyama et al. |
| 6,113,131 A | 9/2000 | Uchara et al. |
| 6,224,090 B1 | 5/2001 | Lutze et al. |
| 6,247,722 B1 | 6/2001 | Brodi, Jr. et al. |

(Continued)

FOREIGN PATENT DOCUMENTS

| DE | 102004038314 | 5/2004 |
| DE | 102005016262 A1 | 10/2006 |

(Continued)

OTHER PUBLICATIONS

English Abstract for DE102004038314.

(Continued)

*Primary Examiner* — Ruth Ilan
(74) *Attorney, Agent, or Firm* — Cantor Colburn LLP

(57) ABSTRACT

A pre-weakened cover of an airbag module is provided. The pre-weakened cover including an outer layer member having an outer show surface and an opposing inner surface; a plurality of first cuts arranged on the inner surface; and a plurality of second cuts arranged on the inner surface, wherein each of the plurality of second cuts intersects at least one adjacent first cut, wherein a plurality of weakened regions are formed at the intersections between the plurality of first cuts and the plurality of second cuts and wherein each of the plurality of first cuts and the plurality of second cuts each have end portions that extend past each intersection to weaken the outer layer member near each intersection.

19 Claims, 6 Drawing Sheets

(56) References Cited

U.S. PATENT DOCUMENTS

| | | |
|---|---|---|
| 6,337,461 B1 | 1/2002 | Yasuda et al. |
| 6,502,852 B2 | 1/2003 | Kassman et al. |
| 6,533,314 B2 | 3/2003 | Merrifield et al. |
| 6,689,306 B2 | 2/2004 | Merrifield et al. |
| 6,692,019 B2 | 2/2004 | Sommer |
| 6,918,609 B1 | 7/2005 | Friery et al. |
| 6,921,105 B2 | 7/2005 | Speelman et al. |
| 7,029,025 B2 | 4/2006 | Schwark et al. |
| 7,093,850 B2 | 8/2006 | Merrifield et al. |
| 7,168,731 B2 | 1/2007 | Yasuda et al. |
| 7,607,681 B2 | 10/2009 | Okada et al. |
| 7,748,733 B2 | 7/2010 | Griebel et al. |
| 7,976,764 B2 | 7/2011 | Schkemmer et al. |
| 8,011,688 B2 | 9/2011 | Komura et al. |
| 8,251,396 B2 | 8/2012 | Zothke et al. |
| 8,342,568 B2 | 1/2013 | Beaupere et al. |
| 8,567,814 B2 | 10/2013 | Crittenden |
| 2001/0010423 A1 | 8/2001 | Bauer et al. |
| 2002/0000711 A1 | 1/2002 | Schmidt et al. |
| 2002/0019505 A1 | 2/2002 | MacLeod et al. |
| 2003/0230875 A1 | 12/2003 | Lutze et al. |
| 2004/0164531 A1 | 8/2004 | Riha et al. |
| 2004/0207181 A1 | 10/2004 | Hayashi et al. |
| 2005/0134023 A1 | 6/2005 | Cowelchuk et al. |
| 2005/0184488 A1 | 8/2005 | Yasuda et al. |
| 2006/0226638 A1 | 10/2006 | Yasuda et al. |
| 2006/0249931 A1 | 11/2006 | Nishijima et al. |
| 2006/0267314 A1 | 11/2006 | Yasuda et al. |
| 2007/0040360 A1 | 2/2007 | Riha et al. |
| 2008/0315566 A1 | 12/2008 | Andrasik, III et al. |
| 2009/0243264 A1 | 10/2009 | Kaulbersch |
| 2009/0267329 A1 | 10/2009 | Kalisz et al. |
| 2010/0276913 A1 | 11/2010 | Zothke et al. |
| 2012/0223512 A1 | 9/2012 | Barr et al. |
| 2013/0049335 A1 | 2/2013 | Wisniewski et al. |

FOREIGN PATENT DOCUMENTS

| | | |
|---|---|---|
| DE | 102007030372.8 A1 | 1/2009 |
| EP | 1750978 B1 | 1/2008 |
| EP | 2420414 | 2/2012 |
| RU | 2010102959 | 8/2011 |
| RU | 2010102959 A | 8/2011 |
| WO | 2006111212 A1 | 10/2006 |
| WO | 2009003558 A1 | 1/2009 |

OTHER PUBLICATIONS

English Abstract for EP1750978A1.
English Abstract for RU2010102959.
International Search Report for International Application No. PCT/US2013/051342; Date of Mailing: Dec. 5, 2013.
Written Opinion for International Application No. PCT/US2013/051342; Date of Mailing: Dec. 5, 2013.
English Abstract for DE102007030372.8.
English Translation to Abtract DE102005016262.
Supplementary European Search Report for EP Application No. 13846281; Date of Mailing: Jun. 9, 2016.

PRE-WEAKENED COVER FOR AN AIRBAG AND METHOD OF MAKING

CROSS-REFERENCE TO RELATED APPLICATIONS

This application is a continuation of U.S. Ser. No. 14/053,092 filed Oct. 14, 2013, which claims the benefit of U.S. Provisional Patent Application No. 61/713,667 filed Oct. 15, 2012, the entire contents each of which are incorporated herein by reference thereto.

BACKGROUND

The present invention relates generally to an instrument panel, driver airbag cover or other interior trim part(s) cover used in a vehicle or any other item having an inflatable cushion or airbag module, and more particularly to an interior trim cover having an integral hidden door and the method of manufacture thereof.

Vehicles are now equipped with some type of inflatable cushions or airbag modules and other vehicle components have been modified to accommodate the use of such systems. For example, most passenger side airbag modules are disposed within and behind an instrument panel which extends across at least a portion of the width of a vehicle compartment. During assembly and/or manufacture, an instrument panel in a vehicle having a passenger side airbag module requires a discrete door which covers an opening formed in the instrument panel for the inflatable cushion to deploy through upon actuation of the airbag module. This separate door is designed to open in response to the force of the expanding inflatable cushion. In other words as the pressure in the inflatable cushion increases, the volume of the cushion increases and applies a force to a portion of the door wherein the door selectively separates from the remaining portion of the instrument panel to permit the inflatable cushion to deploy therethrough.

Accordingly, it is desirable to provide a cover with a pre-weakened area on one side that is not visually perceivable from an opposite side.

SUMMARY OF THE INVENTION

According to one exemplary embodiment of the present invention, a pre-weakened cover of an airbag module is provided including a layer having an outer show surface and an opposing inner surface. A plurality of first cuts and a plurality of second cuts are arranged on the inner surface. Each of the second cuts intersects two adjacent first cuts to form a generally V-shaped pattern.

In another exemplary embodiment, the layer with the outer show surface is a leather layer or a layer of simulated leather.

According to another embodiment of the invention, a method of making a pre-weakened cover for an airbag module is provided including providing a layer having an outer show surface and an opposing inner surface. A plurality of first cuts is formed in the inner surface at a first angle. A plurality of second cuts is formed in the inner surface at a second angle. The plurality of first cuts and the plurality of second cuts form a generally V-shaped pattern.

In yet another embodiment, the method includes the step of pre-weakening a leather layer or a layer of simulated leather that comprises the outer show surface.

In yet another embodiment, a pre-weakened cover of an airbag module is provided. The pre-weakened cover having: an outer layer member having an outer show surface and an opposing inner surface; a plurality of first cuts arranged on the inner surface; and a plurality of second cuts arranged on the inner surface, wherein each of the plurality of second cuts intersects at least one adjacent first cut, wherein a plurality of weakened regions are formed at the intersections between the plurality of first cuts and the plurality of second cuts and wherein each of the plurality of first cuts and the plurality of second cuts each have end portions that extend past each intersection to weaken the outer layer member near each intersection.

In still yet another embodiment, a method of making a pre-weakened cover of an airbag module is provided. The method including the steps of providing an outer layer member having an outer show surface and an opposing inner surface; forming a plurality of first cuts in the inner surface at a first angle; and forming a plurality of second cuts in the inner surface at a second angle such that the plurality of first cuts and the plurality of second cuts form a pattern, wherein each of the plurality of second cuts intersects at least one adjacent first cut and wherein a plurality of weakened regions are formed at the intersections between the plurality of first cuts and the plurality of second cuts and wherein each of the plurality of first cuts and the plurality of second cuts each have end portions that extend past each intersection to weaken the outer layer member near each intersection.

In yet another embodiment, an instrument panel for a vehicle having a pre-weakened cover for an airbag module is provided. The instrument panel having: a deployable door having an outer layer member having an outer show surface and an opposing inner surface; a plurality of first cuts arranged on the inner surface; and a plurality of second cuts arranged on the inner surface, wherein each of the plurality of second cuts intersects at least one adjacent first cut to form a pattern, wherein a plurality of weakened regions are formed at the intersections between the plurality of first cuts and the plurality of second cuts and wherein each of the plurality of first cuts and the plurality of second cuts each have end portions that extend past each intersection to weaken the outer layer member near each intersection, wherein the plurality of first cuts and the plurality of second cuts are not visible from the outer show surface.

BRIEF DESCRIPTION OF THE DRAWINGS

The present invention will now be described, by way of example only, with reference to the accompanying drawings in which.

Figure 1:
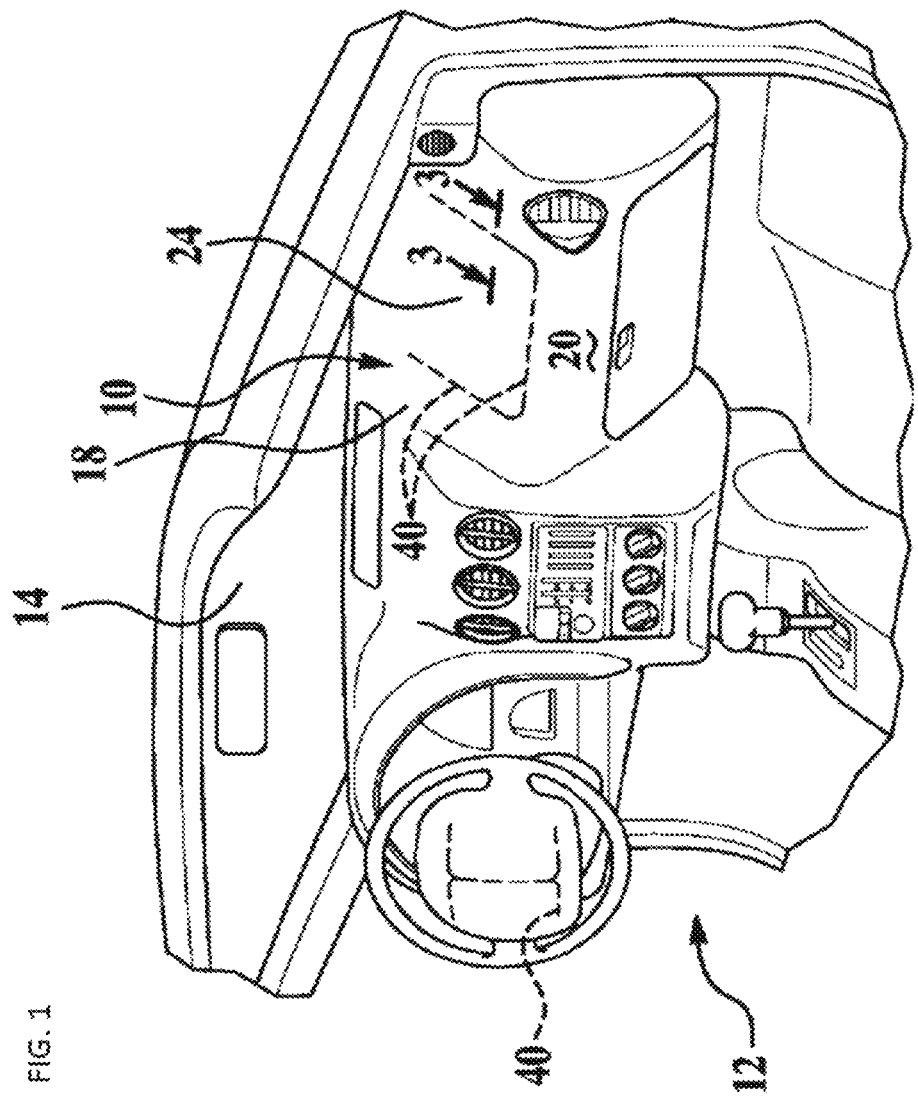
FIG. 1 is a partial perspective view of a vehicle interior.

The above-described and other features and advantages of the present application will be appreciated and understood by those skilled in the art from the following detailed description, drawings, and appended claims.

DETAILED DESCRIPTION OF EXEMPLARY EMBODIMENTS

In accordance with exemplary embodiments of the present invention an airbag module cover/instrument panel with a deployable door and invisible tear seam is provided. In one embodiment, a cutting device is used to provide the tear seam wherein, the tear seam formed by the score is not visually viewable from the outer or show surface of the cover/instrument panel. Non limiting examples of a cutting device include any type of device that can be effectively controlled to provide the desired depths in the scores whether uniform or varying.

In one non-limiting embodiment an ultrasonic embossing or scoring device may be used to score surface 44 wherein at least one blade is oscillated at an ultrasonic frequency as it is advanced into the inner surface of the instrument panel cover to make a very precise cut or score. The depth of this score is controlled very precisely such that the at least one blade will move within a given distance of the outer surface of the instrument panel cover. In addition, the blade configuration itself may be varied to provide the desired effect.

In one application and depending on the material used for the outer layer, the oscillating blade effectively heats and melts the instrument panel cover material at the inner surface to form a given score.

Alternatively a knife or blade may be applied to the surface 44 via an operating device that can effectively control and/or vary the depth of the cut or score in surface 44. In another embodiment and if applicable, a laser scoring device may be utilized.

By precisely controlling the depth of the score(s), the thickness of the remaining unscored material may be controlled and this is important because it the remaining unscored material thickness which determines the force required for the deployment region to separate along the score(s) to permit the air bag cushion to properly deploy therethrough. When the air bag cushion begins to inflate and build pressure therein, the force of the air bag cushion against the inner surface causes the score(s) defining the periphery of the deployment region to tear or separate to form an opening for the air bag cushion to pass therethrough.

The cover/instrument panel will provide a means for covering a portion of an airbag module, having an inflatable cushion that is positioned to deploy through the deployable door defined by the tear seams/seam of the cover/instrument panel. The pressure of the inflating cushion will cause the deployable door to pivot open while tearing along the tear seams positioned in a portion of cover in order to provide an opening for the inflatable cushion to deploy therethrough while a portion of the deployable door is still pivotally secured to the cover instrument panel.

Figure 2:
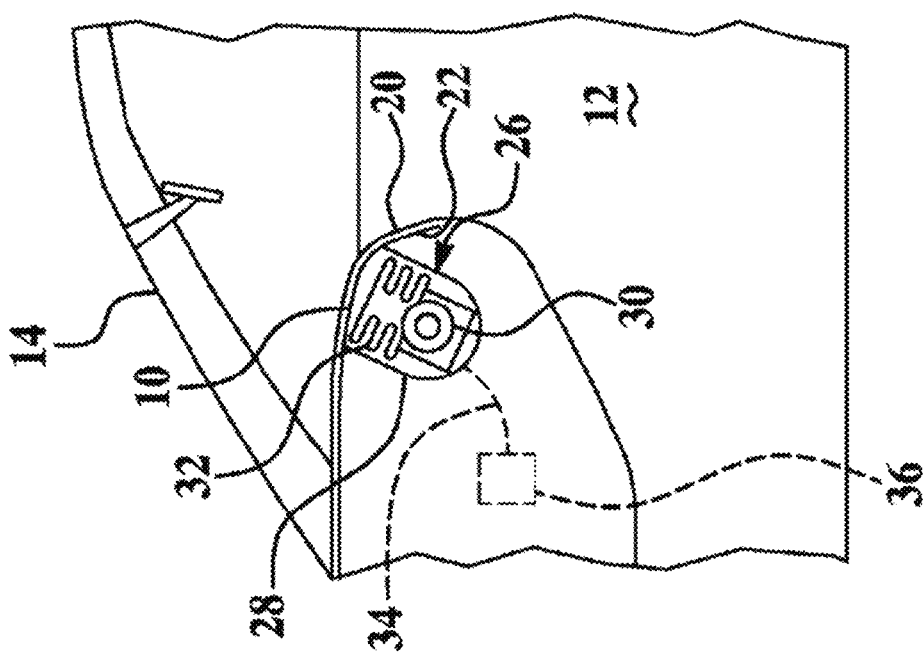
FIG. 2 is a partial cross-sectional view of a vehicle interior.

Referring now to FIGS. 1-2, an instrument panel is generally indicated at 10. The instrument panel 10 is assembled into a vehicle passenger compartment 12. The instrument panel 10 is generally disposed beneath a windshield 14 and extends across substantially the entire width of the passenger compartment 12. The instrument panel 10 may additionally include a deployment door 24 formed therein. The deployment door 24 is intended to be in the general area corresponding to a passenger side airbag module 26 (see FIG. 2). Accordingly, the passenger side airbag module 26 is located and deployed therethrough during actuation under predetermined deployment conditions.

An airbag module 26, such as the passenger side airbag module for example, includes a housing 28, an inflator 30 and an inflatable cushion 32. The inflator 30 inflates the inflatable cushion 32 in response to a signal 34 received from a sensing or control module 36 configured to determine if an activation event is occurring. As is known in the related arts, the control module 36 receives signals 34 from a plurality of sensors disposed throughout the vehicle.

It is, of course, understood that the passenger side airbag module 26 and the configuration of the instrument panel 10 illustrated in FIGS. 1 and 2 are provided as examples and various other configurations of the instrument panel 10 and the airbag module 26 are contemplated. Thus, various embodiments of the present invention are not intended to be limited to the specific configurations illustrated.

The instrument panel 10 may be formed from a plurality of layers, such as an outer layer, an intermediary layer, and a substrate layer for example, each comprising any of a number of suitable materials or combinations thereof. Preferred materials are those materials that have the desired characteristics of strength, durability, flexibility, and finished appearance and feel for use as an instrument panel 10 or a cover for a driver's side airbag module.

Figure 3:
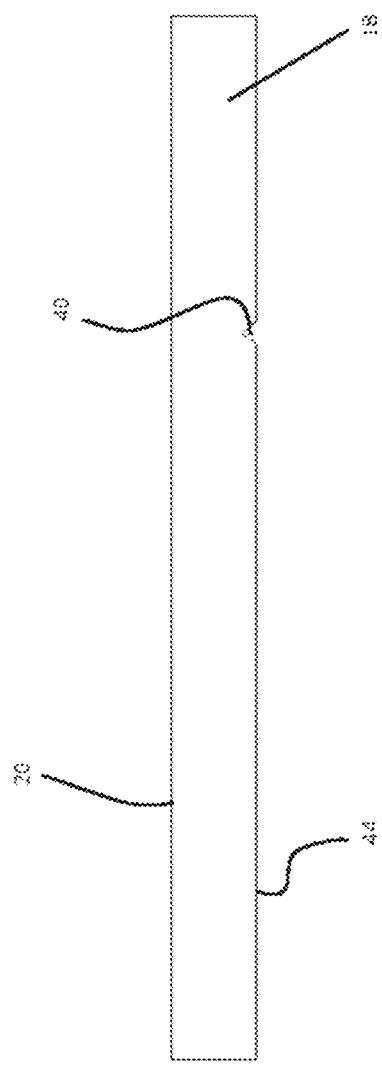
FIG. 3 is a view of the outer layer along lines 3-3 of FIG. 1.

As shown in FIG. 3, an outer layer 18 includes an inner surface 44 that may be positioned adjacent an intermediary layer and an outer show surface 20 that is exposed to the passenger compartment 12, and therefore, to the occupants of the vehicle. Thus, the outer layer 18 should be formed from a material that has an aesthetically pleasing outer appearance. In one embodiment, the outer layer 18 may be formed from a leather material, such as real leather or simulated leather for example. The outer layer 18 acts as a cover for a portion of an airbag module 26, such as the airbag module 26 housed within the instrument panel 10 for example. The instrument panel 10 and cover of the airbag module 26 are formed with a tear seam 40 to facilitate the deployment of an airbag module 26. For example, the tear seam 40 in the cover and instrument panel 10 defines the deployment door 24 through which an airbag module 26 deploys.

Figure 3A:
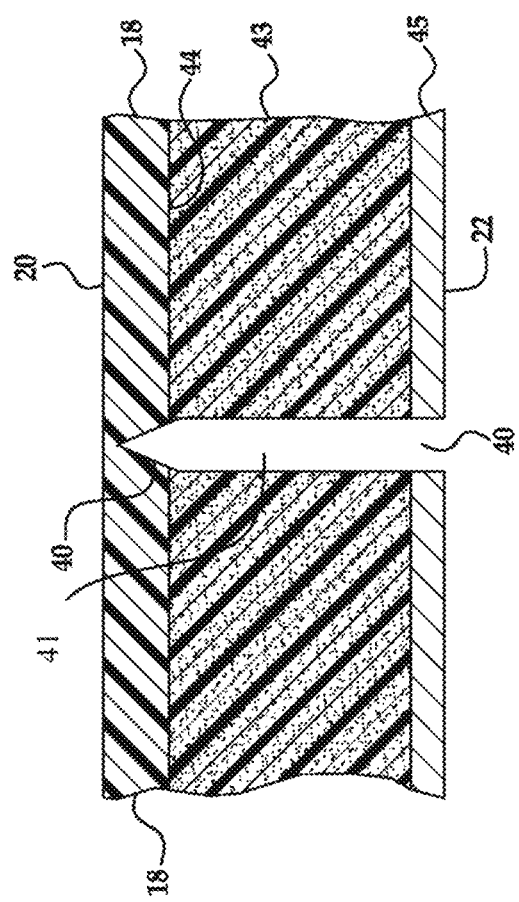
FIG. 3A is a view of a multiple layer instrument panel along the lines 3-3 of FIG. 1.

FIG. 3A illustrates a cross-sectional view of a tear seam of an instrument panel 10 in accordance with one non-limiting embodiment. Here and as mentioned above the outer layer 18 has show surface 20 and an inner surface 44 and in this embodiment, the instrument panel/cover has an intermediary foam layer 43 and a substrate layer 45. The combination of the outer layer 18, foam layer 43 and substrate layer 45 when separated from the remaining portions of the instrument panel along the tear seam 40 define a deployment door opening in the cover/instrument panel. Of course, the deployment door may simply comprise outer layer 18 and a foam layer 43. Alternatively, the cover or door may simply comprise only outer layer 18. Still further the cover and/or door may comprise layer 18 and any other combination of backing layers.

FIG. 3A shows one non-limiting embodiment wherein the deployment door or opening may be defined by a cut, groove or opening 41 or plurality of cuts, grooves or openings 41 that extends into the cover/instrument panel from the substrate layer 45, into the foam layer 43 and then are aligned or partially aligned with the tear seam 40 formed in the inner surface 44 of the outer layer 18. However and as illustrated, the tear seam does not extend all the way through to the outer surface 20 of outer layer 18. Thus, and when the cover or layer is installed in the vehicle the tear seam is not visible through the show surface. Alternatively, the tear seam 40 may only be formed in outer layer 18. In yet another embodiment, the tear seam 40 formed in outer layer 18 may be aligned with a tear seam in the foam layer 43 and/or the substrate layer 45. In yet another embodiment, the tear seam 40 formed in outer layer 18 may be aligned with a tear seam in the foam layer 43 and/or the substrate layer 45. In still another embodiment, the tear seam 40 formed in outer layer 18 may be completely offset or partially offset from the tear seam in the foam layer 43 and/or the substrate layer 45 or may be partially aligned or partially offset from the tear seam in the foam layer 43 and/or the substrate layer 45 so that only a portion of the tear seam 40 is aligned with the tear seam openings in layers 43 and/or 45.

Figure 4:
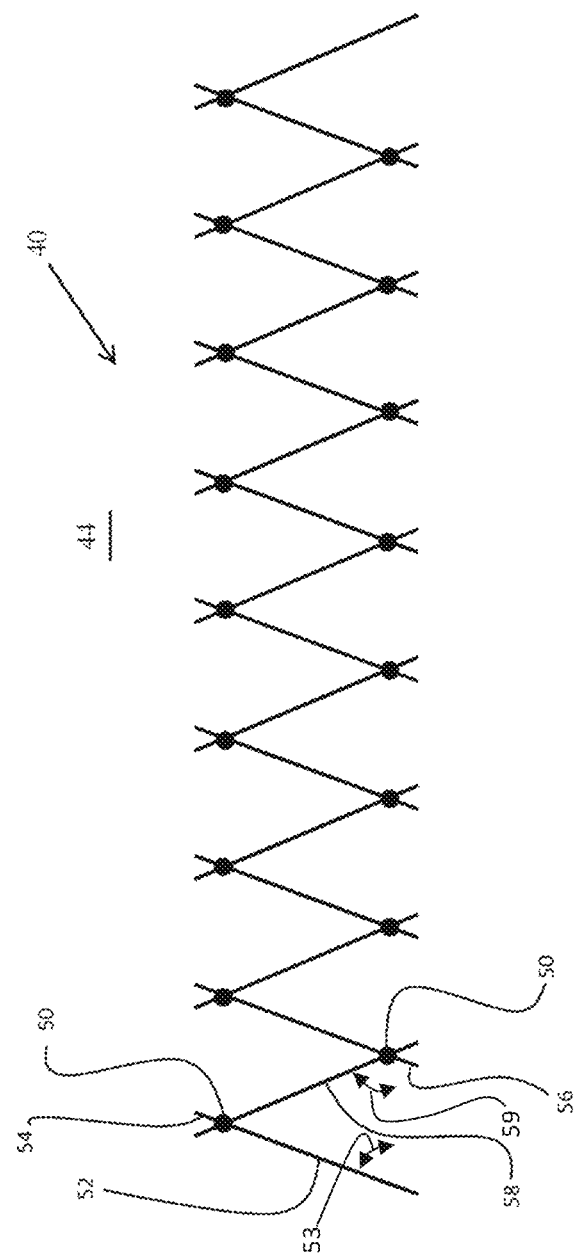
FIG. 4 is a top view of a tear seam according to an embodiment of the present invention.
Figure 5:
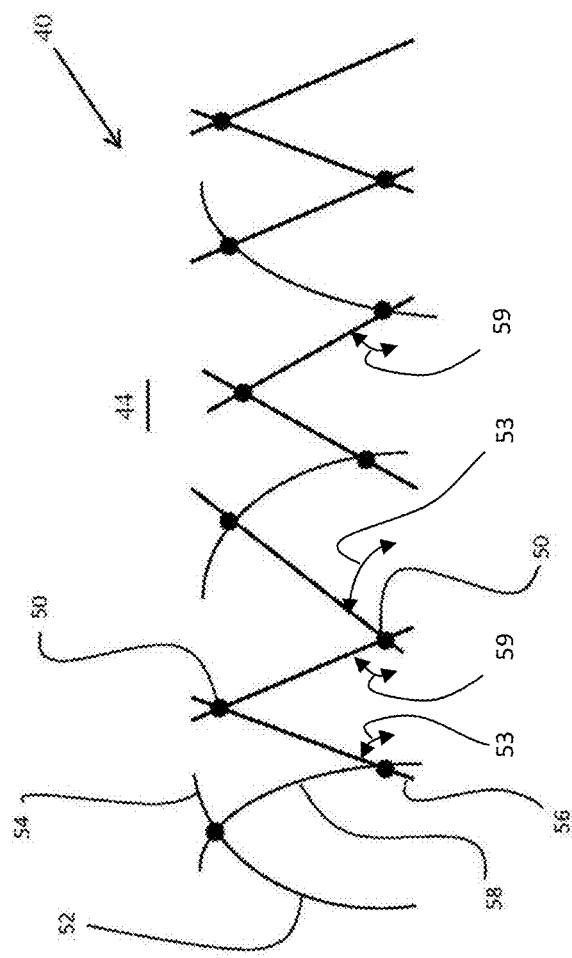
FIG. 5 is a top view of an alternate tear seam according to an embodiment of the present invention.

Referring now to FIGS. 4 and 5, the tear seam 40 or a portion of the tear seam 40 includes a plurality of weakened regions 50 on the inner surface 44 of the outer layer 18 such that when the airbag module 26 is actuated, the outer layer 18 tears along this run of weakened regions 50. In one embodiment, the weakened regions 50 of the tear seam 40 are arranged such that when the airbag module 26 is actuated, the deployment door 24 separates from the remainder of the instrument panel 10 in a series of generally V-shaped or zig-zag pattern. In one embodiment, the tear seam 40 includes a plurality of first cuts 52 and a plurality of second cuts 58 formed at intervals along the periphery of the deployable door 24. The first and second cuts 52, 58 may be generally linear or alternatively may be generally curved. The first and second cuts 52, 58 are non-uniform and consecutive cuts 52, 58 may vary in both shape and size.

Each of the first cuts 52 are arranged at an angle 53 relative to the deployable door 24. In one embodiment, the first cuts are arranged at a similar angle, such as a 30 degree or 45 degree angle for example. Alternatively, the first cuts may be arranged at varying angles. The second cuts 58 are also at an angle 59 to the deployable door 24 and are configured to intersect two adjacent first cuts 52 to form a series of generally V-shaped cuts in the inner surface 44. The plurality of second cuts 58 may be arranged at a similar angle. In one embodiment, the angles formed by the second cuts 58 are equal and opposite to the angles formed by the first cuts 52. Alternatively, each of the second cuts 58 may be arranged at a varying angle, and the angles of the second cuts 58 may be distinct from the angles of by the first cuts 52.

The second cuts 58 intersect a first cut 52 near a first end 54 and intersect an adjacent first cut 52 near a second, opposite end 56. The ends of both the first cut 52 and the second cut 58 extend beyond these intersections to weaken the portion of the outer layer 18 near the intersection. Consequently, the weakened regions 50 of the tear seam 40 are therefore located at these intersections between the first cuts 52 and the second cuts 58. By forming the first cuts and the second cuts as a mixture of both curved and linear cuts arranged (see at least FIG. 5) at different angles, the tear seam 40 created in the outer layer 18 will be difficult to detect from the show surface 20 even as the outer layer ages.

In one embodiment, a cutting or scoring device may be used to create the tear seam 40 and weakened regions 50 in the outer layer 18. Exemplary cutting and scoring devices include but are not limited to a knife, scalpel, rotary knife, and ultra-sonic knife for example. Alternatively, a needle punch may be used to generate the intersecting first and second cuts 52, 58 of the tear seam 40. The cutting depth may vary between adjacent cuts 52, 58 and also may vary between the first end and the second end of each cut. In one embodiment, the cutting depth of the plurality of first cuts 52 and the plurality of second cuts 58 is deeper adjacent an intersection with an adjacent cut.

Though the outer layer 18 is described in the previous embodiment as a cover for a passenger side airbag module 26 in an instrument panel 10, the outer layer 18 may also be used as a cover for other airbag modules 26 in various locations throughout a vehicle. In particular, the outer layer 18 may be incorporated into any surface (e.g., leather or otherwise) of the vehicle as a cover for an airbag module 26. For instance, the outer layer 18 may be integrated into a steering wheel, any of the seats in the vehicle, or the paneling on the side of a door. Moreover, the outer layer 18 may be used as a single layer or may be used in combination with other layers such as the intermediary layer and the substrate layer or any combination thereof including other layers or only just the outer layer 18 formed from leather or a simulated leather material.

In accordance with various embodiments of the present invention, the instrument panel may be formed from a plurality of layers each comprising any one of a number of suitable materials or combinations thereof. In one embodiment, the instrument panel may be formed from thermoplastic and thermoset materials and/or a leather material and/or a simulated leather material.

For example, suitable thermoplastic materials include but are not limited to polyethylene based polyolefin elastomer or polypropylene based thermoplastic elastomer, poly-urethane resins and other co-polymers and equivalents thereof. Non-limiting examples include; thermoplastic elastic olefin (TEO), thermoplastic elastomer (TPE), thermoplastic elastomer-oefinic (TPE-O, TPO), thermoplastic elastomer-styrenic (TPE-S), Polycarbonate (PC), Polycarbonate/Acrylonitrile-Butadiene-Styrene (PC/ABS), Acrylonitrile-Butadiene-Styrene (ABS) copolymers, Poly-urethane (TPU) and Polyvinyl-Chloride (PVC).

Non-limiting examples of thermosets include but are not limited to polyamide, polybutadiene, polyether block amide (PEBA), polyetherimide, polyimide, polyurea, polyurethane (PUR), silicone, vinyl ester, phenolic, melamine, urea formaldehyde resins, Fluoropolymers such as polytetrafluoroethylene (PTFE) and polyvinylidene fluoride (PVDF).

In one non-limiting embodiment the sheet, outer material or outer layer 18 may be formed from materials including but not limited to polyurethane, poly vinyl chloride (PVC), imitation leather, real leather products and any other equivalent material capable of providing the desired show surface. After the sheet of material or outer layer 18 is formed the comprising the tear seam 40 are made in the outer layer 18. In one embodiment, the show surface 20 of the outer layer 18 may be configured to have a textured or grainy textured to provide an aesthetically pleasing appearance (e.g., a simulated leather texture).

It is, of course, understood that the passenger side airbag module and the configuration of the instrument panel illustrated in the FIGS. are provided as examples and various other configurations of the instrument panel and the airbag module are contemplated thus, the present invention is not intended to be limited to the specific configurations illustrated in the FIGS.

Although a vehicle passenger side airbag is illustrated it is, of course, understood that a deployable airbag door with an invisible tear seam may be formed over any type of vehicle airbag (e.g., driver side, seat, door module, side curtain airbag, knee bolster, etc.) in accordance with various embodiments of the present invention.

Reference is made to the following U.S. Patents the contents each of which are incorporated herein by reference thereto U.S. Pat. Nos. 6,533,314; 6,689,306; 6,692,019; 6,921,105; and 7,093,850. Reference is also made to the following U.S. Patent Publication U.S. 2008/0315566, the contents of which is also incorporated herein by reference thereto.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A pre-weakened cover of an airbag module, comprising:
    an outer layer member having an outer show surface and an opposing inner surface;
    a plurality of first cuts arranged on the inner surface; and
    a plurality of second cuts arranged on the inner surface, wherein each of the plurality of second cuts intersects at least one adjacent first cut, wherein a plurality of weakened regions are formed at the intersections between the plurality of first cuts and the plurality of second cuts and wherein each of the plurality of first cuts and the plurality of second cuts each have end portions that extend past each intersection to weaken the outer layer member near each intersection.

2. The pre-weakened cover according to claim 1, wherein each of the plurality of first cuts is arranged at a first angle.

3. The pre-weakened cover according to claim 2, wherein the first angle of each of the plurality of first cuts varies.

4. The pre-weakened cover according to claim 1, wherein each of the plurality of second cuts is arranged at a second angle.

5. The pre-weakened cover according to claim 4, wherein the second angle of each of the plurality of second cuts varies.

6. The pre-weakened cover according to claim 1, wherein the plurality of first cuts and the plurality of second cuts are non-uniform in shape and size.

7. The pre-weakened cover according to claim 1, wherein the cover is an integral portion of an instrument panel.

8. The pre-weakened cover according to claim 1, wherein the cover is configured to tear along a pattern between the plurality of weakened regions.

9. The pre-weakened cover according to claim 1, wherein the plurality of first cuts and the plurality of second cuts are formed only in the outer layer member.

10. The pre-weakened cover according to claim 1, wherein the plurality of first cuts and the plurality of second cuts are formed by a needle point.

11. The pre-weakened cover as claim 1, wherein the outer layer member is formed from a simulated leather material.

12. A method of making a pre-weakened cover of an airbag module comprising:
    providing an outer layer member having an outer show surface and an opposing inner surface;
    forming a plurality of first cuts in the inner surface at a first angle; and
    forming a plurality of second cuts in the inner surface at a second angle such that the plurality of first cuts and the plurality of second cuts form a pattern, wherein each of the plurality of second cuts intersects at least one adjacent first cut and wherein a plurality of weakened regions are formed at the intersections between the plurality of first cuts and the plurality of second cuts and wherein each of the plurality of first cuts and the plurality of second cuts each have end portions that extend past each intersection to weaken the outer layer member near each intersection.

13. The method according to claim 12, wherein the first angle of each of the plurality of first cuts varies.

14. The method according to claim 12, wherein the second angle of each of the plurality of second cuts varies.

15. The method according to claim 12, wherein the plurality of first cuts and the plurality of second cuts are non-uniform in shape and size.

16. An instrument panel formed by the method of claim 12.

17. The method according to claim 12, wherein the cover is configured to tear along the pattern.

18. The method according to claim 12, wherein the plurality of first cuts and the plurality of second cuts are formed using a cutting device.

19. An instrument panel for a vehicle having a pre-weakened cover for an airbag module, the instrument panel comprising:
    a deployable door having an outer layer member having an outer show surface and an opposing inner surface;
    a plurality of first cuts arranged on the inner surface; and
    a plurality of second cuts arranged on the inner surface, wherein each of the plurality of second cuts intersects at least one adjacent first cut to form a pattern, wherein a plurality of weakened regions are formed at the intersections between the plurality of first cuts and the plurality of second cuts and wherein each of the plurality of first cuts and the plurality of second cuts each have end portions that extend past each intersection to weaken the outer layer member near each intersection, wherein the plurality of first cuts and the plurality of second cuts are not visible from the outer show surface.

* * * * *